United States Patent
Ito

(10) Patent No.: US 10,718,411 B2
(45) Date of Patent: Jul. 21, 2020

(54) POWER TRANSMISSION APPARATUS

(71) Applicant: TOYOTA BOSHOKU KABUSHIKI KAISHA, Aichi (JP)

(72) Inventor: Sadao Ito, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 323 days.

(21) Appl. No.: 15/690,755

(22) Filed: Aug. 30, 2017

(65) Prior Publication Data
US 2018/0066736 A1    Mar. 8, 2018

(30) Foreign Application Priority Data
Sep. 8, 2016    (JP) .................................. 2016-175787

(51) Int. Cl.
| | | |
|---|---|---|
| *F16H 19/00* | (2006.01) | |
| *B60N 2/16* | (2006.01) | |
| *F16H 1/20* | (2006.01) | |
| *F16H 57/039* | (2012.01) | |
| *F16H 57/02* | (2012.01) | |

(Continued)

(52) U.S. Cl.
CPC ......... *F16H 19/001* (2013.01); *B60N 2/1615* (2013.01); *F16H 1/203* (2013.01); *F16H 57/039* (2013.01); *B60N 2/166* (2013.01); *B60N 2002/0236* (2013.01); *F16H 57/031* (2013.01);

(Continued)

(58) Field of Classification Search
CPC . F16H 2019/008; F16H 57/039; B60N 2/166; B60N 2002/0236
See application file for complete search history.

(56) References Cited

U.S. PATENT DOCUMENTS

| | | | | |
|---|---|---|---|---|
| 2002/0011748 A1* | 1/2002 | Ito | ...................... | B60N 2/0232 |
| | | | | 297/362 |
| 2013/0047764 A1* | 2/2013 | Yamaoka | .............. | F16H 19/001 |
| | | | | 74/411.5 |

(Continued)

FOREIGN PATENT DOCUMENTS

| | | |
|---|---|---|
| JP | S63120944 U | 8/1988 |
| JP | 2001-340153 | 12/2001 |

OTHER PUBLICATIONS

Japanese Office Action in counterpart Japanese patent application No. 2016-175787, dated Feb. 25, 2020 (and machine-generated English translation).

*Primary Examiner* — Terence Boes
(74) *Attorney, Agent, or Firm* — Greenblum & Bernstein, P.L.C.

(57) ABSTRACT

A power transmission apparatus in one aspect of the present disclosure comprises at least one gear that transmits an inputted driving force to at least one output part; at least one shaft that supports the at least one gear; a displacement portion configured to be mechanically interlocked with a displacement gear among the at least one gear and displaced in association with the displacement gear; a housing that houses the at least one gear and the at least one shaft; and an abutting portion that is disposed in the housing and configured to restrict a possible displacement range of the displacement portion by abutting the displacement portion. The abutting portion is configured so as not to be displaced along with a rotation of the at least one gear and is disposed in the housing at a location spaced apart from the at least one shaft.

16 Claims, 10 Drawing Sheets

(51) Int. Cl.
  *B60N 2/02* (2006.01)
  *F16H 57/031* (2012.01)
(52) U.S. Cl.
  CPC ............... *F16H 2019/008* (2013.01); *F16H 2057/02034* (2013.01); *F16H 2057/02082* (2013.01)

(56) References Cited

U.S. PATENT DOCUMENTS

| | | | |
|---|---|---|---|
| 2016/0017964 A1* | 1/2016 | Yu | E06B 9/32 160/168.1 P |
| 2016/0059752 A1* | 3/2016 | Kishida | F16H 57/039 297/344.12 |
| 2016/0201773 A1* | 7/2016 | Ta | E05B 81/02 74/421 A |
| 2017/0246967 A1* | 8/2017 | Pichardo Ramirez | B60N 2/1655 |
| 2018/0201158 A1* | 7/2018 | Hoffmann | F16H 1/32 |
| 2019/0232821 A1* | 8/2019 | Ellison | B60N 2/0228 |

* cited by examiner

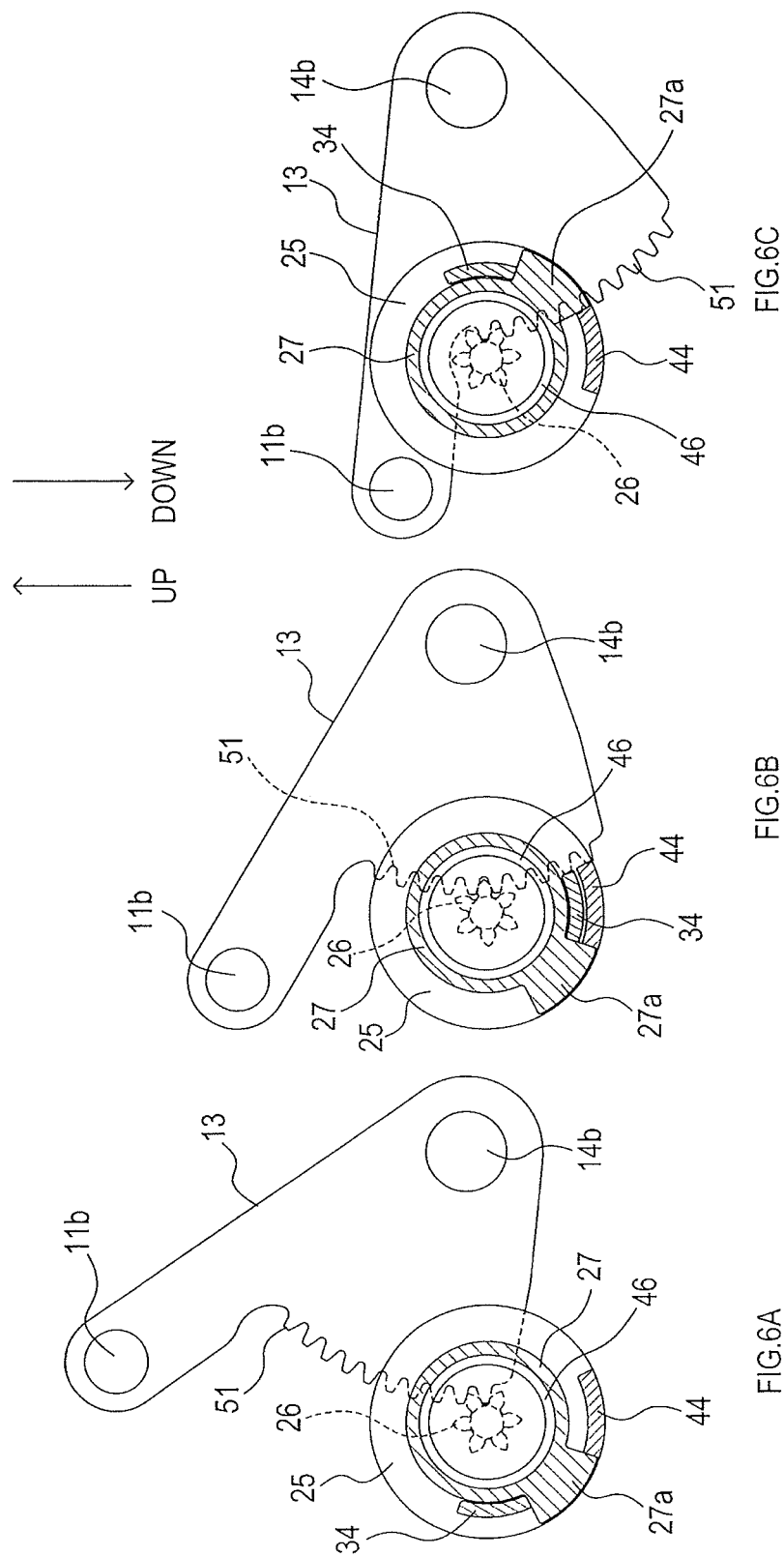

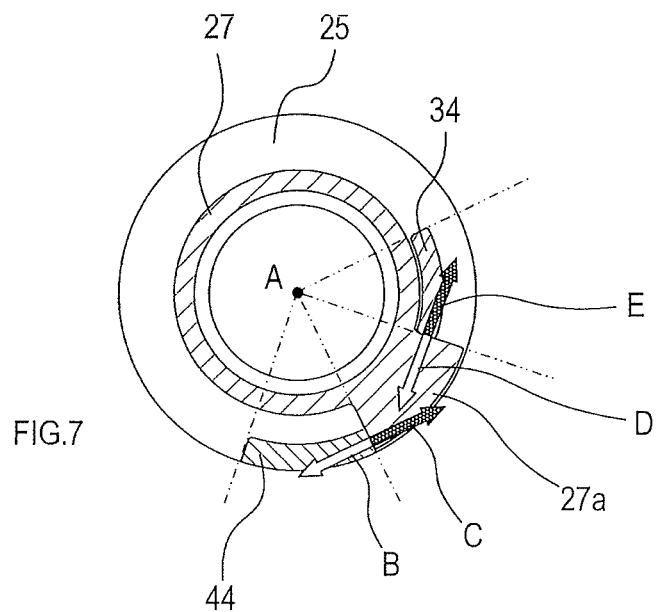

POWER TRANSMISSION APPARATUS

CROSS-REFERENCE TO RELATED APPLICATIONS

This application claims the benefit of Japanese Patent Application No. 2016-175787 filed Sep. 8, 2016 in the Japan Patent Office, the disclosure of which is incorporated herein by reference.

BACKGROUND

The present disclosure relates to a power transmission apparatus that comprises one or more gears to transmit power.

A power transmission apparatus that uses a motor driving force to move a target object has been conventionally used. A method to restrict a rotation range of a gear to restrict a moving range of a target object to a desired range has also been known. For example, Japanese Unexamined Patent Application Publication No. 2001-340153 discloses a configuration to restrict a rotation range of a gear by causing a stop plate, which rotates along with the rotation of the gear, to abut a stop washer that is arranged coaxially with a pinion gear.

SUMMARY

The aforementioned configuration disclosed in the aforementioned Patent Document causes the stop plate to abut the stop washer to stop the rotation of the gear. Therefore, a heavy load is imposed on a shaft of the pinion gear where the stop washer is disposed, which results in a risk of decreases in durability of a power transmission apparatus.

It is desirable that one aspect of the present disclosure is to reduce decreases in durability of a power transmission apparatus.

A power transmission apparatus in one aspect of the present disclosure comprises at least one gear, at least one shaft, a displacement portion, a housing, and an abutting portion. The at least one gear is for transmitting an inputted driving force to at least one output part. The at least one shaft supports the at least one gear. The displacement portion is configured to be mechanically interlocked with a displacement gear among the at least one gear and displaced in association with the displacement gear. The housing houses the at least one gear, and the at least one shaft. The abutting portion is disposed in the housing and configured to restrict a possible displacement range of the displacement portion by abutting the displacement portion. Furthermore, the abutting portion is not displaced along with a rotation of the at least one gear and is disposed in the housing at a location spaced apart from the at least one shaft.

According to such a power transmission apparatus as mentioned above, it is possible to reduce influence of abutment of the displacement portion against the abutting portion on the function of the power transmission apparatus, since the abutting portion that abuts the displacement portion is disposed on a part other than functional parts of the housing. As a consequence, such a power transmission apparatus is less likely to experience malfunctions or failures, which makes it possible to reduce decreases in durability of the power transmission apparatus. For example, the at least one shaft that supports the at least one gear, and a part that is displaced along with the rotation of the at least one gear may fall under the definition of the functional parts of the housing. In other words, those parts other than the functional parts can also be defined as parts other than the at least one shaft, and other than the part that is displaced along with the rotation of the at least one gear.

In the aforementioned power transmission apparatus, the housing may comprise a recess to house at least the displacement gear, and a lid that covers at least a part of an opening of the recess. The recess may comprise a base, and a circumferential wall that is arranged to stand on the base. The abutting portion may be disposed either on the base or on the circumferential wall, or may be disposed over both the base and the circumferential wall. According to such a power transmission apparatus, strength of the housing can be enhanced by the recess. Since the abutting portion is disposed in the recess with high strength, influences imposed on the power transmission apparatus caused by abutment of the displacement portion against the abutting portion can be significantly reduced.

In the aforementioned configuration, the abutting portion may be disposed at least on the base. Since a base of a recess is high in strength, influences imposed on the power transmission apparatus caused by abutment of the displacement portion against the abutting portion can be significantly reduced by having the abutting portion at least on the base of the recess.

In the aforementioned power transmission apparatus, the displacement portion may be configured to be displaced when pressed by a pressing portion that is disposed on a side face of the displacement gear, integrally with the displacement gear. The power transmission apparatus that is configured as described above can simplify a mechanism to interlock the displacement gear and the displacement portion. It is therefore possible to seek downsizing of the entire power transmission apparatus.

In the aforementioned power transmission apparatus, the displacement portion may be configured to be mechanically interlocked with the displacement gear and rotationally displaced about a rotational axis of the displacement gear. Abutting areas of the abutting portion and the displacement portion, against which they abut each other, may be shaped such that a load imposed on the displacement portion is directed towards the direction of a tangent line to an imaginary circle, whose center is a rotational axis of the displacement portion, when the displacement portion rotates and abuts the abutting portion.

According to the power transmission apparatus that is configured as described above, a large portion of a load, imposed on the displacement portion by the abutting portion as a reaction force when the displacement portion abuts the abutting portion, is directed towards the aforementioned direction of the tangent line. It is therefore possible to reduce imposition of loads, which is not directed to the rotational direction of the displacement portion, on the displacement portion and to reduce the occurrence of malfunctions in the displacement portion.

In the aforementioned power transmission apparatus, the displacement gear may be a worm wheel that meshes with a worm to form a deceleration mechanism. Moreover, the aforementioned power transmission apparatus may be configured so that the rotation of the displacement gear is the output of the power transmission apparatus.

According to the power transmission apparatus that is configured as described above, the rotational frequency of the displacement gear can be decreased; a displacement range of the displacement portion is accordingly small compared with a case where the displacement gear is not an output shaft. It is therefore possible to seek downsizing and simplification of a mechanism for restricting the displacement range of the displacement portion.

BRIEF DESCRIPTION OF THE DRAWINGS

Example embodiments of the present disclosure will be described hereinafter with reference to the accompanying drawings, in which:

FIG. 6A to FIG. 6C are schematic diagrams that explain dispositions of a rear-link, a second worm wheel, and a stop plate when the rotation angle of a pinion gear is restricted;

FIG. 7 is a diagram that explains the shape of a displacement portion, a pressing portion, and an abutting portion, to restrict clockwise movement of the pressing portion when seat cushion is in a down position;

DETAILED DESCRIPTION OF THE PREFERRED EMBODIMENTS

First Embodiment

[1-1. Overall Configuration]

The present example embodiment shows a power transmission apparatus of the present disclosure used in a lifter structure (e.g., a four-joint link mechanism) for moving up and down a seat for vehicles such as automobiles.

In the first embodiment, a configuration of components may be explained by using words that represent directions such as front and rear; left and right; and up and down. These words for directions are only used for convenience in explanation, and therefore do not cause any limitations in the embodiments of the present disclosure. For easy understanding, a passenger seated in a normal seating position is used as a reference for determining the aforementioned directions. For example, the directions up, down, front, and rear are shown in FIG. 1.

Figure 1:
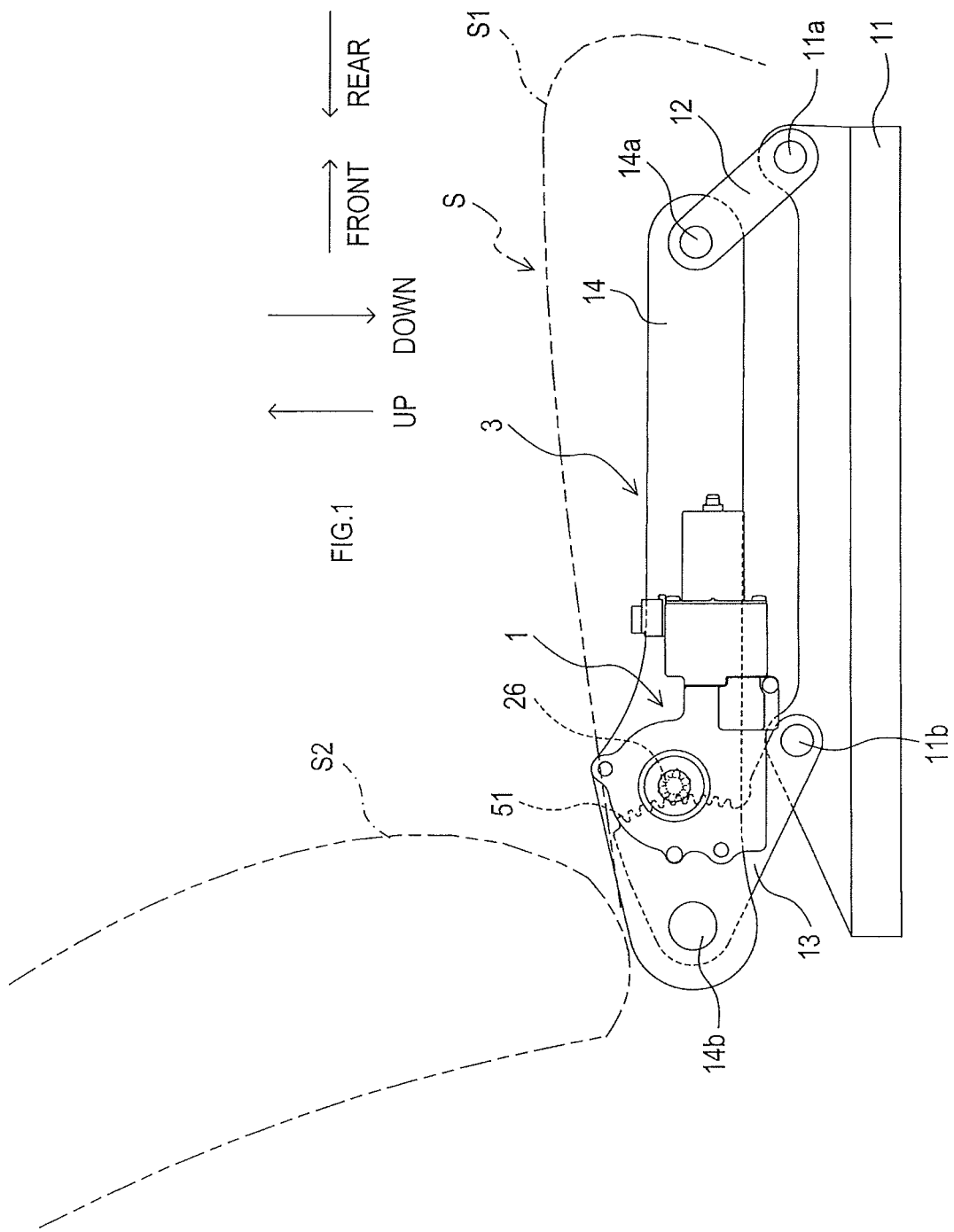
FIG. 1 is a side view illustrating a four-joint link mechanism and a power transmission apparatus of a first embodiment.

As shown in FIG. 1, a power transmission apparatus 1 of the present embodiment drives a four-joint link mechanism 3 for moving a seat S (including seat cushion S1 and seat back S2) in a predefined direction. The four-joint link mechanism 3 comprises a supporting member 11; a front-link 12, and a rear-link 13 arranged respectively in front of, and at the rear of the supporting member 11; and a cushion-side frame 14 coupled to upper ends of the front-link 12 and the rear-link 13.

The supporting member 11 is disposed on a floor inside a compartment of a vehicle. The supporting member 11 may comprise an additional mechanism to move or tilt the seat S to the front or rear, or in other directions.

A lower portion of the front-link 12 is rotatably coupled to a rotational shaft 11a, which is situated on a foreside of the supporting member 11. An upper portion of the front-link 12 is rotatably coupled to a rotational shaft 14a, which is situated on a foreside of the cushion-side frame 14.

A lower portion of the rear-link 13 is rotatably coupled to a rotational shaft 11b, which is situated on a rear-side of the supporting member 11. An upper portion of the rear-link 13 is rotatably coupled to a rotational shaft 14b, which is situated on a rear-side of the cushion-side frame 14. The rear-link 13 also serves as a sector gear; and includes teeth 51 that may rotate about the rotational shaft 14b as the teeth 51 are driven.

The cushion-side frame 14 is attached to the power transmission apparatus 1. A pinion gear 26, which is an output shaft of the power transmission apparatus 1, meshes with (and drives) the teeth 51 of the rear-link 13. As the pinion gear 26 rotates, the rear-link 13 is driven about the rotational shaft 14b. The four-joint link mechanism 3 is consequently reconfigured (altered), and moves the cushion-side frame 14 up or down. Along with this reconfiguration, the seat cushion S1 supported by the cushion-side frame 14 moves up and down, and the seatback S2 coupled to the cushion-side frame 14 moves up and down.

[1-2. Configuration of Power Transmission Apparatus]

Figure 2:
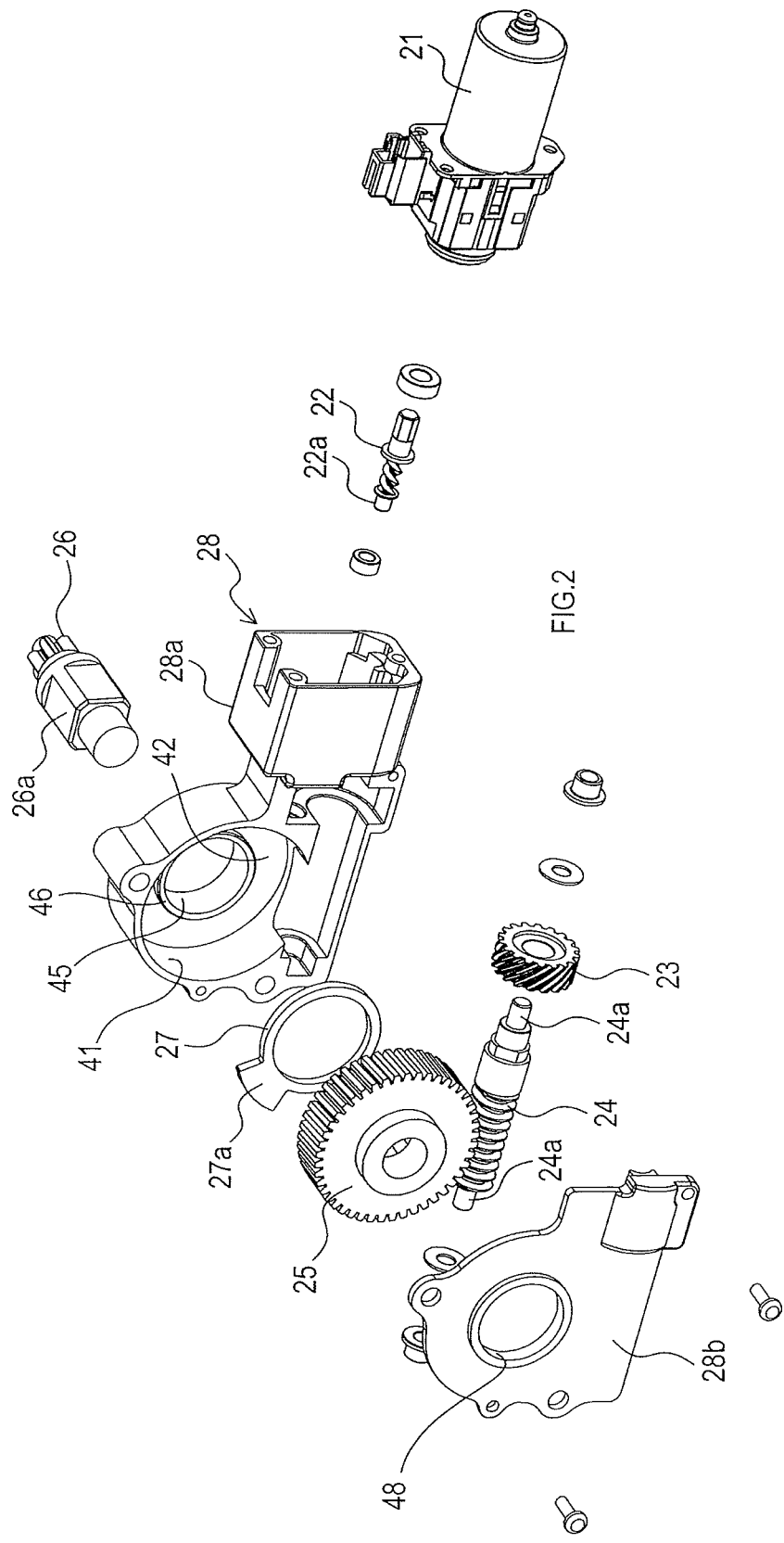
FIG. 2 is an exploded perspective view of the power transmission apparatus of the first embodiment.
Figure 3E:
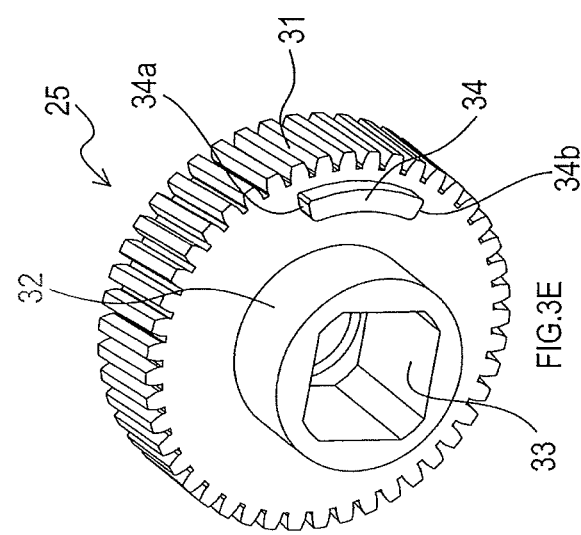
FIG. 3E is a perspective view of the second worm wheel.
Figure 3C:
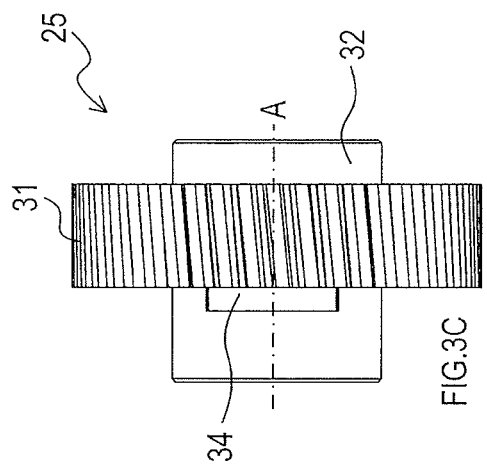
FIG. 3C is a side view of the second worm wheel.
Figure 3D:
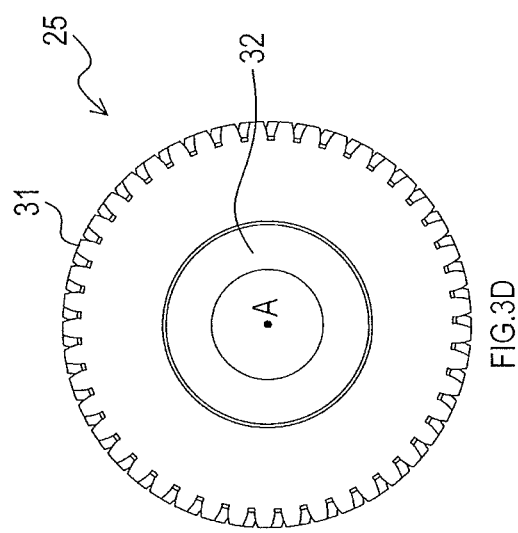
FIG. 3D is a base view of the second worm wheel.
Figure 3A:
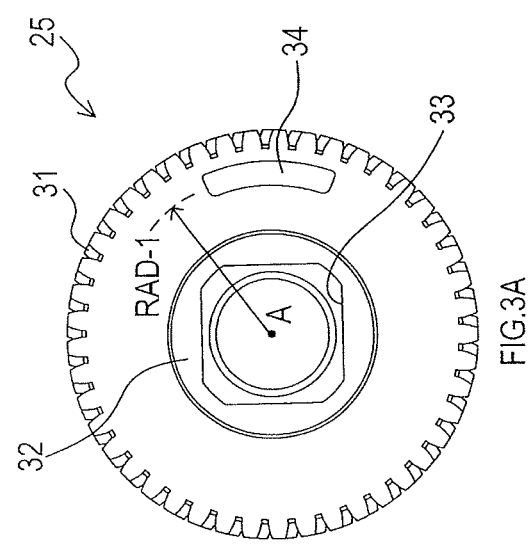
FIG. 3A is a plan view of a second worm wheel.
Figure 3B:
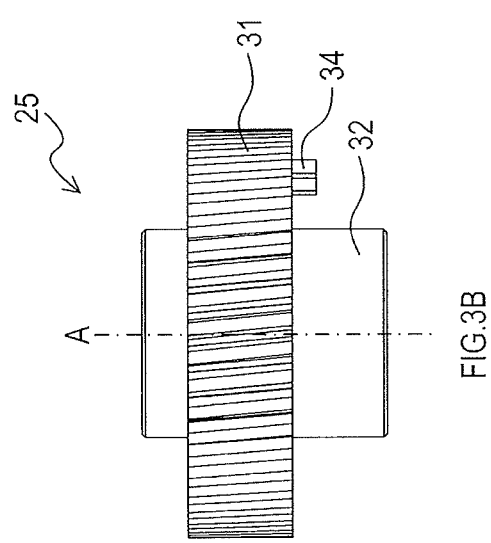
FIG. 3B is a front view of the second worm wheel.

As shown in FIG. 2, the power transmission apparatus 1 comprises: a motor 21, a first worm 22, a first worm wheel 23, a second worm 24, a second worm wheel 25, the pinion gear 26, a stop plate 27, and a housing 28.

The motor 21 generates a rotational driving force. Each of the first worm 22, the first worm wheel 23, the second worm 24, and the second worm wheel 25 transmit, in sequence, the rotational driving force to at least one output part such as the pinion gear 26. The pinion gear 26 is an output gear of the power transmission apparatus 1.

The first worm 22 is rotated by the motor 21 and meshes with the first worm wheel 23 to form a worm gear (a first worm system). The first worm wheel 23 is fixed to the second worm 24 so as to drive the second worm 24; thus, the second worm 24 is rotated by the rotation of the first worm wheel 23. The second worm 24 meshes with the second worm wheel 25 to form a worm gear (a second worm system), and causes the second worm wheel 25 to rotate. Each of the aforementioned two worm gears (worm systems) serves as a deceleration mechanism.

As shown in FIG. 3A to FIG. 3E, the second worm wheel 25 is a helical gear having teeth 31 whose tooth trace is slanted relative to the rotational axis A. The second worm wheel 25 is disposed such that a cylindrical body 32 protrudes from both side faces of the second worm wheel 25; the axis of the cylindrical body 32 is the rotation axis A, which is the rotational axis of the rotational movement of the second worm wheel 25. An approximately rectangular hole 33 is formed on one end (a drive side) of the cylindrical body 32. The rectangular hole 33 is formed such that a body 26a of the pinion gear 26 (see FIG. 2) fits into the rectangular hole 33 with substantially no gaps. This causes the second worm wheel 25 and the pinion gear 26 to rotate integrally with each other when the body 26*a* is inserted into the rectangular hole 33. In other words, the rectangular hole 33 directly rotationally drives the pinion gear 26. Other configurations such as a hexagonal hole or a slot/key system may rotationally link the second worm wheel 25 to the pinion gear 26.

A pressing portion 34 is formed integrally with the second worm wheel 25 on a drive side face of the second worm wheel 25 (on the same side as the rectangular hole 33). The pressing portion 34 is a protrusion having its length extending in a circumferential direction around the rotation axis A. The rotation axis A is not only the rotational axis for the second worm wheel 25, but is also the rotational axis for the pinion gear 26 and the stop plate 27. The pressing portion 34 has a top end 34*a* and a bottom end 34*b*. The pressing portion 34 is located at a first radius RAD-1 from the rotation axis A.

The second worm wheel 25 serves as a displacement gear of the present disclosure. The cylindrical body 32 of the second worm wheel 25, as well as a first worm shaft 22*a* of the first worm 22 and a second worm shaft 24*a* of the second worm 24, as shown in FIG. 2, correspond to the at least one shaft supporting the respective gears of the present disclosure; and the at least one shaft will also be collectively referred to as the shafts in the explanations provided hereinafter.

As shown in FIG. 2, the stop plate 27 has an overall shape of a circle, and includes the displacement portion 27*a* (which is fan-shaped and expands outwardly). The stop plate 27 is configured to be mechanically interlocked with the second worm wheel 25 to displace the displacement portion 27*a*. Detailed movement of the stop plate 27 will be explained later.

The housing 28 comprises a main body 28*a* and a lid 28*b*, and houses the aforementioned gears and shafts.

Figure 4A:
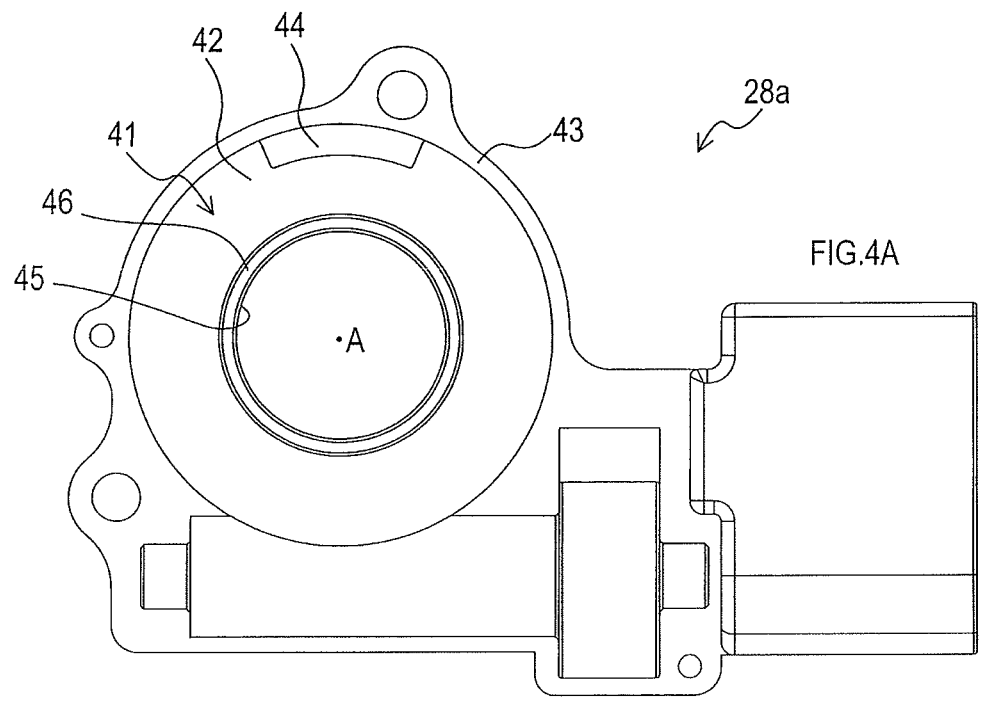
FIG. 4A is a front view of the housing.
Figure 4B:
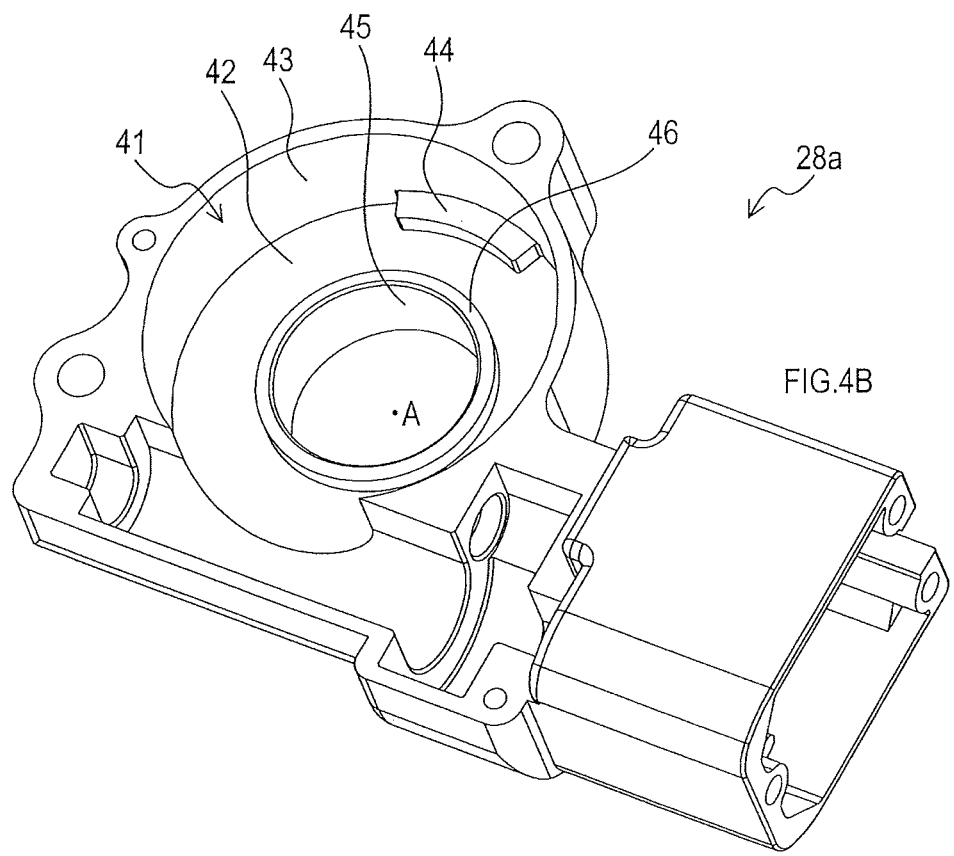
FIG. 4B is a perspective view of the housing of the power transmission apparatus.

As shown in FIG. 4A and FIG. 4B, an approximately cylindrical recess 41 is formed on the main body 28*a*. An approximately cylindrical recess 41 comprises a base 42, and a circumferential wall 43 that is arranged to stand on the base 42. At a boundary area between the base 42 and the circumferential wall 43, an abutting portion 44 is disposed over both of the base 42 and the circumferential wall 43; the abutting portion 44 protrudes both in the radial inward direction of the recess 41 (radially inward towards the rotation axis A) and in the axial direction of the recess 41 (parallel with the rotation axis A). A main body through-hole 45 and a cylindrical part 46 (disposed around the main body through-hole 45) are formed on the base 42.

The abutting portion 44 is a protrusion having its length extending in the circumferential direction around the rotation axis A. The abutting portion 44 is permanently fixed to the housing 28, and is not displaced along with a rotation of each gear housed in the housing 28. The abutting portion 44 is disposed on the base 42 and on the circumferential wall 43 of the recess 41 in the main body 28*a*, at a location spaced apart from the aforementioned shafts.

Figure 5A:
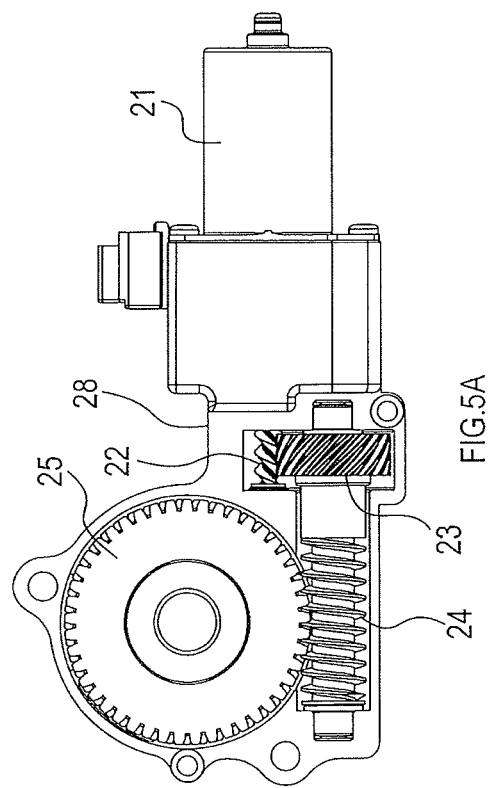
FIG. 5A is a front view of the power transmission apparatus without a lid (including worms and worm wheels)
Figure 5B:
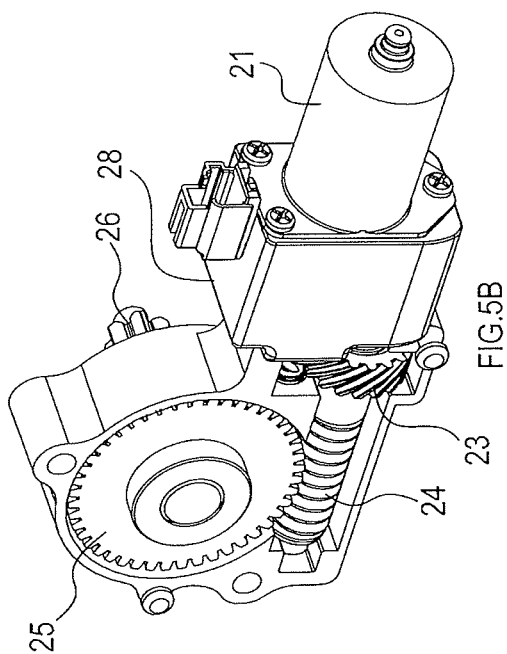
FIG. 5B is a perspective view of the power transmission apparatus without the lid.
Figure 5C:
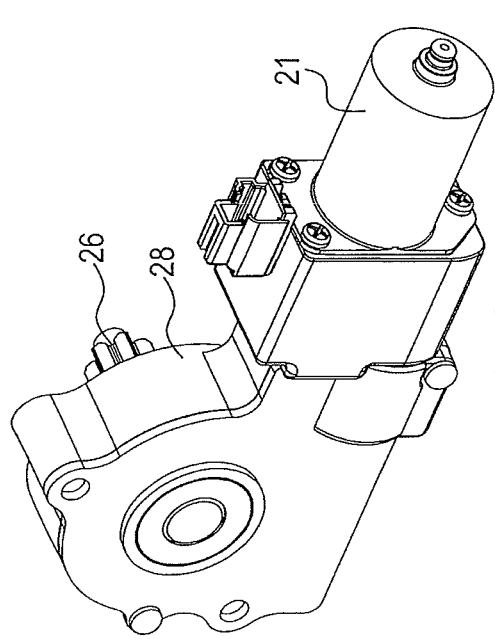
FIG. 5C and FIG. 5D are perspective views of the power transmission apparatus.
Figure 5D:
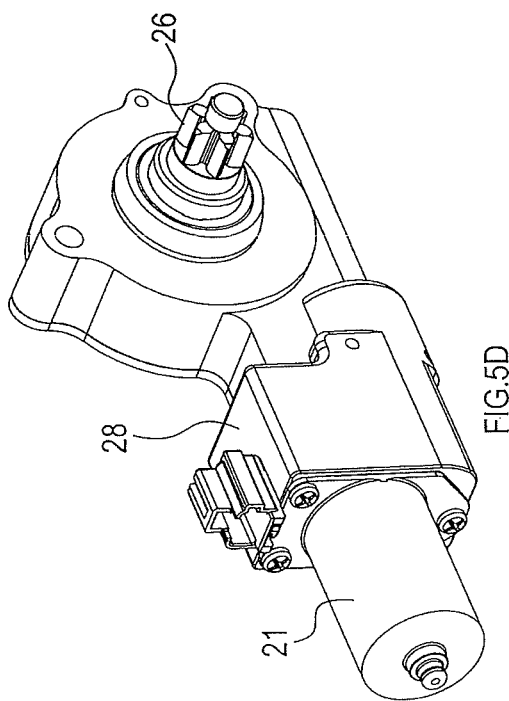

The second worm wheel 25 and the stop plate 27 are housed in the recess 41, see FIG. 5A.

As shown in FIG. 2, the lid 28*b* is shaped to cover an opening of the recess 41, which is opposite the base 42. A lid through-hole 48 is formed in the lid 28*b*.

As shown in FIG. 5A to FIG. 5D, the main body 28*a* has the motor 21 attached thereto, and has the aforementioned gears and the stop plate 27 housed therein. As shown in FIG. 6A to FIG. 6C, the stop plate 27 is externally fitted to the cylindrical part 46 so as to be rotatable around the cylindrical part 46.

[1-3. Restrictions on Rotation Range of Power Transmission Apparatus]

Restrictions on an angular range in which the pinion gear 26 can be rotated, in the power transmission apparatus 1 of the present embodiment, are explained next.

For easy understanding, FIG. 6A to FIG. 6C show only a partial configuration of the power transmission apparatus 1, including the rear-link 13, the second worm wheel 25, the pinion gear 26, the stop plate 27, the pressing portion 34, and the abutting portion 44. The second worm wheel 25 is simplified for convenience.

When the pinion gear 26 rotates, the positional relationship between the pinion gear 26 and the teeth 51 of the rear-link 13 changes in the range shown in FIG. 6A to FIG. 6C. This is the range within which a movable range of the pinion gear 26 is restricted.

The pinion gear 26 and the second worm wheel 25 rotate integrally with each other as mentioned above (because the rectangular hole 33 of the second worm wheel 25 mates with the body 26*a* of the pinion gear 26). The pressing portion 34 accordingly rotates integrally with the rotation of the pinion gear 26. FIG. 6A illustrates a state where the left (counter-clockwise) rotation of the pinion gear 26 is restricted, since the pressing portion 34 indirectly contacts the abutting portion 44 via the displacement portion 27*a* of the stop plate 27 and restricts the movement of the pressing portion 34.

If the pinion gear 26 rotates to the right (clockwise) starting from the state shown in FIG. 6A, then the pressing portion 34 accordingly rotates to the right. If the pinion gear 26 rotates to the state shown in FIG. 6B, then the pressing portion 34 begins abutting the displacement portion 27*a*.

If, starting with the position in FIG. 6B, the clockwise rotation continues, then the displacement portion 27*a* (and the stop plate 27) is rotated by the pressing portion 34. The pinion gear 26 is enabled to continue rotating because the stop plate 27 is freely rotatable around the cylindrical part 46 (when near the position shown in FIG. 6B). If the pinion gear 26 rotates to the right to the state shown in FIG. 6C, then the right rotation of the pinion gear 26 is restricted since the pressing portion 34 indirectly contacts the abutting portion 44 via the displacement portion 27*a*. If the pinion gear 26 rotates to the left starting from the state shown in FIG. 6C, then the displacement portion 27*a* is rotated to the left by the pressing portion 34 to finally reach the position shown in FIG. 6A.

As described above, the abutting portion 44 imposes restrictions on the possible displacement range of the stop plate 27 by abutting the displacement portion 27*a*, which is pressed and displaced by the pressing portion 34. The abutting portion 44 accordingly imposes restrictions on the rotatable range of the pressing portion 34 (and on the pinion gear 26 that is mated to the rectangular hole 33). In the present embodiment, the total rotatable range of the pinion gear 26 is about one and a half rotations.

As shown in FIG. 7, both ends of the pressing portion 34 in its length direction, both ends of the displacement portion 27*a* in its rotational direction, and both ends of the abutting portion 44 in its length direction are each formed so as to be situated on a single plane surface (or, more precisely, in a single thin disk) that crosses the rotation axis A.

Consequently, a large portion of a load imposed on the abutting portion 44 (shown with an arrow B) and a load imposed on the displacement portion 27*a* (as a reaction force shown with an arrow C) is directed along a tangent line (not shown) to an imaginary circle, whose center is the rotation axis A, when the stop plate 27 is rotated and the displacement portion 27*a* abuts the abutting portion 44 (see FIG.

6C). Similarly, a large portion of loads imposed on the stop plate 27 and on the pressing portion 34 (respectively shown with an arrow D and an arrow E) is likewise directed along a tangent line (not shown) to an smaller imaginary circle, whose center is the rotation axis A, when the second worm wheel 25 is rotated and the displacement portion 27a abuts the pressing portion 34 (see FIG. 6C).

[1-4. Effects]

According to the first embodiment as described above in detail, the following effects can be obtained.

(1a) In the power transmission apparatus 1, the abutting portion 44 is disposed in the housing 28 neither at a location that is on the shafts that support each gear nor at a location that is displaced along with the rotation of each gear. It is therefore possible to reduce influences imposed on the function of the power transmission apparatus 1 caused by abutment of the displacement portion 27a against the abutting portion 44. As a consequence, the power transmission apparatus 1 is less likely to experience malfunctions or failures, which makes it possible to reduce decreases in durability of the power transmission apparatus 1.

(1b) In the power transmission apparatus 1, strength of the housing 28 can be enhanced by the recess 41. By disposing the abutting portion 44 over both of the base 42 of the recess 41, which has high strength as mentioned above, and on the circumferential wall 43, influences imposed on the power transmission apparatus 1 caused by abutment of the displacement portion 27a against the abutting portion 44 can be highly reduced.

(1c) In the power transmission apparatus 1, a mechanism to displace the stop plate 27 can be made simple since the stop plate 27 is displaced when pressed by the pressing portion 34 that is formed on the second worm wheel 25. It is therefore possible to seek downsizing of the entire power transmission apparatus 1.

(1d) In the power transmission apparatus 1, a large portion of a load, imposed on the displacement portion 27a by the abutting portion 44 as a reaction force when the displacement portion 27a abuts the abutting portion 44, is directed towards the aforementioned direction of a tangent line. It is therefore possible to reduce imposition of loads, which is not directed to the rotational direction of the displacement portion 27a on the displacement portion 27a, and to reduce the occurrence of malfunctions in the displacement portion 27a.

Similar advantages occur in abutting areas of the displacement portion 27a and the pressing portion 34.

(1e) In the power transmission apparatus 1, the second worm wheel 25 is the gear that has the least rotational frequency in the power transmission apparatus 1. Accordingly, the displacement range of the displacement portion 27a is small compared with that when the rotation of the second worm wheel 25, in other words, the rotation of the pinion gear 26, is not an output rotation. It is therefore possible to reduce complication or expansion of the mechanism to restrict the displacement range of the displacement portion 27a.

Second Embodiment

[2-1. Overall Configuration]

In the second embodiment, configuration of the power transmission apparatus is partially different compared with the first embodiment. Such differences will be explained hereinafter. Components that are marked with the same reference numerals as the components of the first embodiment are configured identically to the first embodiment. For these identical components, reference should be made to the explanations provided hereinbefore.

Figure 8:
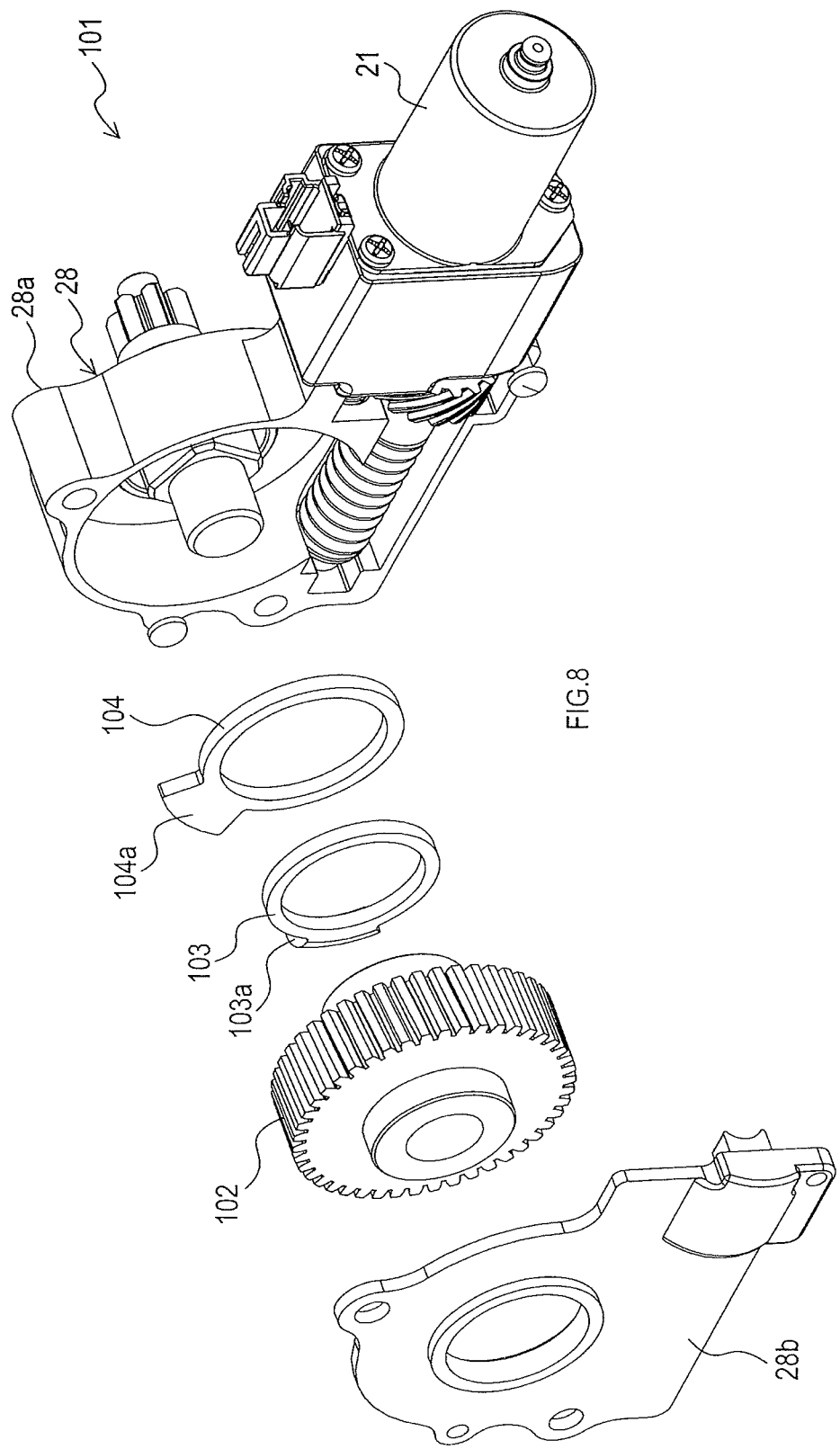
FIG. 8 is an exploded perspective view of a power transmission apparatus of a second embodiment including a first stop plate and a second stop plate.

As shown in FIG. 8, a power transmission apparatus 101 of the present embodiment comprises a second worm wheel 102 having a differently shaped side face as a substitute for the second worm wheel 25 of the first embodiment. The power transmission apparatus 101 also comprises a first stop plate 103 and a second stop plate 104. The second stop plate 104 has the same shape as the stop plate 27 of the first embodiment.

Figure 9:
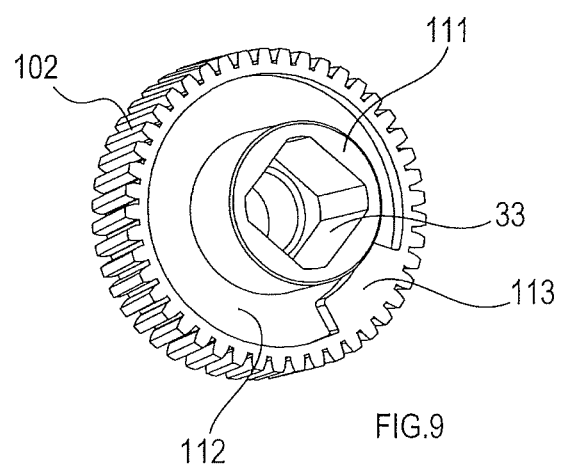
FIG. 9 is a perspective view of a second worm wheel of the second embodiment.

As shown in FIG. 9, a side face of the second worm wheel 102 comprises a circular groove 112 formed around a cylindrical body 111. A part of the outer-circumferential wall of the groove 112 forms a pressing portion 113 that overhangs towards the center. This pressing portion 113 is similar to the abutting portion 44 in FIG. 4A, except that the pressing portion 113 rotates as a part of the second worm gear 103. In contrast, the abutting portion 44 is fixed as a part of the housing 28.

Referring now back to FIG. 8. The first stop plate 103 has an overall shape of a circle. A first displacement portion 103a, which is shaped to protrude outwardly in a radial direction, is formed on one portion of the outer circumference of the first stop plate 103. The first stop plate 103 is externally fitted to the cylindrical body 111 so as to be freely rotatable around the cylindrical body 111.

A rotation range of the second worm wheel 102 (and of the pinion gear 26 mated to the second worm wheel 102) of the power transmission apparatus 101 will be explained by referring to FIG. 10A and FIG. 10B. In a manner similar to the first embodiment, the angular range (restricted rotational range) of the pinion gear 26 (not shown in FIG. 10A and FIG. 10B) is equal to the angular range in which the second worm wheel 102, which rotates integrally with the pinion gear 26, can be rotated.

Figure 10A:
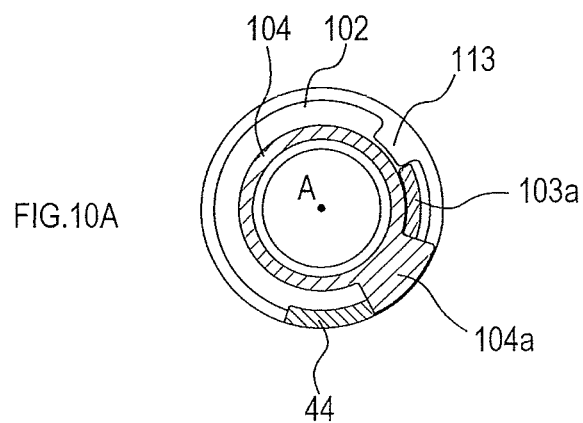
FIG. 10A and FIG. 10B are schematic diagrams that explain disposition of the second worm wheel, a first displacement portion, and a second displacement portion of the second embodiment.
Figure 10B:
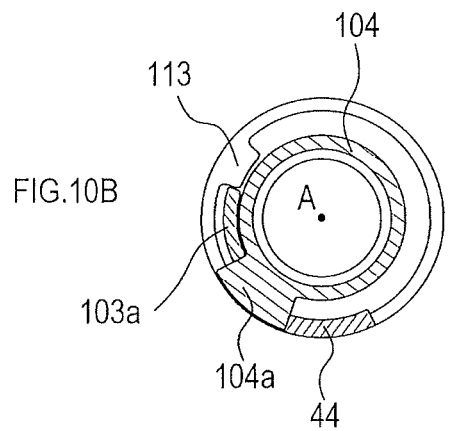

In other words, the second worm wheel 102 cannot rotate to the right around the rotation axis A starting in the position shown in FIG. 10A, since the pressing portion 113 indirectly contacts the abutting portion 44 via the first displacement portion 103a and the second displacement portion 104a, and restricts the movement of the pressing portion 113.

If the second worm wheel 102 rotates to the left starting in the position shown in FIG. 10A, then the pressing portion 113 accordingly rotates to the left and abuts the first displacement portion 103a after almost one rotation. The pressing portion 113 does not abut the second displacement portion 104a and the abutting portion 44, because the pressing portion 113 is spaced apart from the second displacement portion 104a and the abutting portion 44 in the axis direction.

If the pressing portion 113 presses the first displacement portion 103a and rotates to the left for another almost one rotation, the first displacement portion 103a abuts the second displacement portion 104a. If the pressing portion 113 continues to press the first displacement portion 103a and the second displacement portion 104a and rotates to the left until the second displacement portion 104a abuts the abutting portion 44, then no further rotation of the pressing portion 113 is possible.

In other words, in the second embodiment, the rotatable range of the second worm wheel 102, thus the rotatable range of the pinion gear 26, is greater than two full rotations (about 2.5 rotations). As explained above, the rotatable range of the pinion gear 26 in the second embodiment is greater than the rotatable range of the pinion gear 26 of the power transmission apparatus 1 in the first embodiment.

[2-2. Effects]

According to the second embodiment as described above in detail, the aforementioned effects (1a) to (1e) in the first embodiment can be obtained, and also the rotatable range of the pinion gear 26 can be increased to more than two full rotations.

Other Embodiments

The embodiments of the present disclosure have been described above; however, the present disclosure is not limited thereto and can be modified in various modes.

(3a) The aforementioned embodiments describe example configurations of the power transmission apparatus (1, 101) that is used in a seat apparatus for vehicles. Nevertheless, the power transmission apparatus of the present disclosure can also be used in various apparatus other than the seat apparatus for vehicles.

The number, types, and combinations of gears, which can be used in the power transmission apparatus, are also not limited to those described in the aforementioned embodiments; and various modifications are possible. Moreover, the power transmission apparatus does not have to comprise a driving source such as a motor.

(3b) Configuration of the displacement portions (27a, 103a, and 104a) is not limited to the examples described in the aforementioned embodiments. It is only required that the displacement portion (27a, 103a, 104a) is at least mechanically interlocked with any one of the at least one gear disposed in the power transmission apparatus. For example, the displacement portion (27a, 103a, 104a) does not have to be rotationally displaced as described in the aforementioned embodiments and may be displaced in a linear or curved manner. In this case, an abutting portion for restricting the displacement range of the displacement portion can be disposed at two or more locations.

(3c) Configuration of the housing 28 is also not limited to the examples described in the aforementioned embodiments. It is only required that the housing 28 at least holds the gears and the shafts for the gears; and may be in a shape without any other components such as the recess 41 and the lid 28b for covering the opening of the recess 41. The lid 28b does not have to be formed to completely cover the opening of the recess 41. By covering at least a part of the opening of the recess 41 by the lid 28b, the possibility of occurrence of drop-off components, such as gears, can be reduced.

(3d) In the aforementioned embodiments, an example shows a configuration in which the abutting portion 44 is disposed over both of the base 42 and the circumferential wall 43 of the recess 41. Nevertheless, the abutting portion 44 may be disposed either on the base 42 or on the circumferential wall 43, or may be disposed at a location that is neither on the base 42 nor on the circumferential wall 43. An abutting portion does not have to be formed integrally with a housing as long as it is disposed at a specified location in the housing. The specified location is a location spaced apart from the shafts of the gears with which the power transmission apparatus transmits the driving force to the at least one output part. In other words, it is only required that an abutting portion is not any one of the aforementioned shafts of the gears. Nevertheless, any shaft other than those for transmitting the driving force to the at least one output part may be used as an abutting portion, since such a shaft has reduced influence on the transmission of the driving force.

In the aforementioned embodiment, an example shows a configuration in which the abutting portion 44 is formed integrally with the housing 28. Nevertheless, an abutting portion does not have to be formed integrally with a housing. In other words, the abutting portion 44 may also be configured to be attachable to and detachable from the housing 28 by a fixation method, such as fixation by screwing, by insertion into a hole, and by an adhesive.

(3e) In the first embodiment, an example shows a configuration in which both ends of the pressing portion 34 in its length direction, both ends of the displacement portion 27a in its rotational direction, and both ends of the abutting portion 44 in its length direction are each formed so as to be situated on a plane surface that crosses the rotation axis A. However, the abutting areas of the pressing portion 34, the displacement portion 27a, and the abutting portion 44 (hereinafter, each of these components are also simply referred to as a subject component), against which they abut each other, may be formed into various shapes to an extent of not losing function of each subject component. The function of each subject component is, more specifically, 1) rotation of the pressing portion 34 along with the second worm wheel 25; followed by 2) rotation of the displacement portion 27a pressed by the pressing portion 34; and followed by 3) abutment of the displacement portion 27a against the abutting portion 44.

The first embodiment shows an effect that a large portion of the load imposed on each subject component is directed towards the aforementioned direction of the tangent line to an imaginary circle, whose center is the rotation axis A, by having each subject component abut against another subject component at a surface orthogonal to the tangent line. Shapes of the abutment surfaces to obtain this effect is not limited thereto. For example, each subject component may abut against each other at two or more surfaces or points as long as the resultant force is directed towards the aforementioned direction of the tangent line.

(3f) In the aforementioned embodiments, an example shows a configuration in which the pressing portion (34, 113) for displacing the displacement portion (27a, 103a, 104a) is disposed on the second worm wheel (25, 102). However, a pressing portion may be disposed on a gear that is not a worm wheel.

(3g) Two or more functions of one element in the aforementioned embodiments may be achieved by two or more elements; or one function of one element in the aforementioned embodiments may be achieved by two or more elements. Likewise, two or more functions of two or more elements may be achieved by one element; or one function achieved by two or more elements in the aforementioned embodiments may be achieved by one element. A part of the configuration of the aforementioned embodiments may be omitted; and at least a part of the configuration of the aforementioned embodiments may be added to or replaced with other part of the configuration of the aforementioned embodiments. It should be noted that any and all modes that are encompassed in the technical ideas defined by the languages in the scope of the claims are embodiments of the present disclosure.

What is claimed is:

1. A power transmission apparatus comprising:
   at least worm wheel that transmits an inputted driving force to at least one output part;
   at least one shaft that supports the at least worm wheel;
   a stop plate including a displacement portion that is configured to be mechanically interlocked with a displacement gear among the at least worm wheel and displaced in association with the displacement gear;

a housing that houses the at least worm wheel and the at least one shaft; and an abutting portion that is disposed in the housing and configured to restrict a possible displacement range of the displacement portion by abutting the displacement portion, wherein the abutting portion is configured so as not to be displaced along with a rotation of the at least worm wheel and is disposed in the housing at a location spaced apart from the at least one shaft.

2. The power transmission apparatus according to claim 1, wherein the housing comprises a recess that houses at least the displacement gear, and a lid that covers at least a part of an opening of the recess, wherein the recess comprises a base, and a circumferential wall that is arranged to stand on the base, and wherein the abutting portion is disposed either on the base or on the circumferential wall; or disposed on both of the base and the circumferential wall.

3. The power transmission apparatus according to claim 2, wherein the abutting portion is disposed at least on the base.

4. The power transmission apparatus according to claim 1, wherein the displacement portion is configured to be displaced when abutted by a pressing portion that is disposed on a side face of the displacement gear, integrally with the displacement gear.

5. The power transmission apparatus according to claim 1, wherein the displacement portion is configured to be mechanically interlocked with the displacement gear and rotationally displaced about a rotational axis of the displacement gear, and wherein abutting areas of the abutting portion and the displacement portion, against which the abutting portion and the displacement portion abut each other, are shaped such that, when the displacement portion rotates and abuts the abutting portion, a load imposed on the displacement portion is directed towards the direction of a tangent line to an imaginary circle, whose center is a rotational axis of the displacement portion.

6. The power transmission apparatus according to claim 1, wherein the displacement gear is a worm wheel that meshes with a worm to form a deceleration mechanism, and wherein a rotation of the displacement gear is configured as an output of the power transmission apparatus.

7. A power transmission apparatus comprising:
a housing including:
　a base;
　a base circumferential wall; and
　an abutting portion on at least one of the base and the base circumferential wall;
a stop plate including a displacement portion configured to abut a first side of the abutting portion after rotation in a first direction, and to abut a second side of the abutting portion after rotation in a second direction,
a worm wheel including a pressing portion configured to contact, directly or indirectly, a first side of the displacement portion after rotation of the worm wheel in the first direction, and a second side of the displacement portion after rotation of the worm wheel in the second direction.

8. The power transmission apparatus of claim 7, wherein the pressing portion protrudes longitudinally outwardly from a bottom face of the worm wheel.

9. The power transmission apparatus of claim 8,
wherein the stop plate and the worm wheel are coaxial,
wherein the pressing portion is configured to freely rotate radially interior to the abutting portion unless restricted by the displacement portion,
wherein the displacement portion is configured to:
　in a first abutting position, transmit a first force from a first side of the pressing portion to a first side of the abutting portion, thus blocking further rotation of the worm wheel in a first rotational direction; and
　in a second abutting position, transmit a second force from a second side of the pressing portion to a second side of the abutting portion, thus stopping further rotation of the worm wheel in a second rotational direction.

10. The power transmission apparatus of claim 9,
wherein the pressing portion, the displacement portion, and the abutting portion are sized such that the pressing portion rotates a first angle between the first abutting position and the second abutting position, and
wherein the first angle is between 360 degrees and 720 degrees.

11. The power transmission apparatus of claim 10,
wherein the first angle is approximately 540 degrees.

12. The power transmission apparatus of claim 7, further comprising:
an intermediate stop plate including an intermediate displacement portion,
wherein the worm wheel further includes a groove having a groove circumferential surface,
wherein the pressing portion extends radially inwardly from the groove circumferential surface of the groove,
wherein the intermediate stop plate is configured to substantially fit inside of the groove, and is configured to rotate radially freely within the pressing portion unless abutting the pressing portion, and
wherein the intermediate displacement portion is configured to extend longitudinally outside of the groove and to restrict rotation of the displacement portion.

13. The power transmission apparatus of claim 12,
wherein the stop plate, the intermediate stop plate, and the worm wheel are coaxial,
wherein the pressing portion, the intermediate stop plate, the stop plate, and the abutting portion are configured such that in a first abutting position:
　a first side of the pressing portion abuts and presses the intermediate displacement portion,
　the intermediate displacement portion abuts and presses the displacement portion, and
　the displacement portion abuts and presses against the first side of the abutting portion.

14. The power transmission apparatus of claim 13,
wherein the pressing portion, the intermediate stop plate, the stop plate, and the abutting portion are further configured such that in a second abutting position:
　a second side of the pressing portion abuts and presses the intermediate displacement portion;
　the intermediate displacement portion abuts and presses the displacement portion, and
　the displacement portion abuts and presses the second side of the abutting portion.

15. The power transmission apparatus of claim 14,
wherein the pressing portion, the intermediate displacement portion, the displacement portion, and the abutting portion are sized such that the pressing portion rotates a first angle between the first abutting position and the second abutting position, and
wherein the first angle is between 720 degrees and 1080 degrees.

16. The power transmission apparatus of claim 15, wherein the first angle is approximately 810 degrees.

* * * * *